United States Patent
Rozenberg (10) Patent No.: US 9,647,951 B2
(45) Date of Patent: May 9, 2017

(54) MEDIA STREAM RATE RECONSTRUCTION SYSTEM AND METHOD

(71) Applicant: VIDEO FLOW LTD., Binyamina (IL)

(72) Inventor: Adi Rozenberg, Shoham (IL)

( * ) Notice: Subject to any disclaimer, the term of this patent is extended or adjusted under 35 U.S.C. 154(b) by 47 days.

(21) Appl. No.: 14/370,020

(22) PCT Filed: Dec. 31, 2012

(86) PCT No.: PCT/IL2012/000401
§ 371 (c)(1),
(2) Date: Jun. 30, 2014

(87) PCT Pub. No.: WO2013/098809
PCT Pub. Date: Jul. 4, 2013

(65) Prior Publication Data
US 2015/0236967 A1    Aug. 20, 2015

(30) Foreign Application Priority Data
Jan. 1, 2012 (IL) ......................................... 217304

(51) Int. Cl.
*H04L 12/841*   (2013.01)
*H04L 12/925*   (2013.01)
*H04L 29/06*    (2006.01)

(52) U.S. Cl.
CPC ...... *H04L 47/283* (2013.01); *H04L 29/06517* (2013.01); *H04L 47/722* (2013.01)

(58) Field of Classification Search
None
See application file for complete search history.

(56) References Cited

U.S. PATENT DOCUMENTS

| | | | |
|---|---|---|---|
| 2002/0024970 A1* | 2/2002 | Amaral | H04J 3/0632 370/468 |
| 2003/0165136 A1* | 9/2003 | Cornelius | H04L 29/06027 370/356 |
| 2009/0074012 A1* | 3/2009 | Shaffer | H04J 3/0632 370/516 |
| 2011/0261145 A1* | 10/2011 | Kamath | H04N 7/14 348/14.08 |
| 2014/0317475 A1* | 10/2014 | Rozenberg | H03M 13/2909 714/774 |

* cited by examiner

*Primary Examiner* — Sulaiman Nooristany
(74) *Attorney, Agent, or Firm* — 1st Tech Ideas: Haim M. Factor (57) ABSTRACT

In a media delivery system over an Internet Protocol (IP) network, a device for network jitter reduction and rate reconstruction using a means for receiving streams with jitter, buffering the streams, and playing out/streaming each stream at an original rate of respective streams.

11 Claims, 6 Drawing Sheets

MEDIA STREAM RATE RECONSTRUCTION SYSTEM AND METHOD

This US National Stage application claims priority from Israel Patent application no 217304, filed 1 Jan. 2012 and from PCT application no. PCT/IL2012/000401, filed 31 Dec. 2012, whose disclosures are incorporated herein by reference.

Embodiments of the present invention relate to systems for media stream rate reconstruction in a media delivery system over an IP network.

BACKGROUND

Due to different traveled paths and changing conditions on the network, during packet transmission over a network, packets may be received with a jitter and at a varying rate.

Media delivery systems, which use an IP network, are prone to jitter introduction due to the asynchronous nature of packet switching in the IP network. This jitter must be managed and overcome by IP reception devices, using for example a jitter buffer and sophisticated algorithms. A big problem facing the IP reception devices is the small amount of buffer allocated for the management of jitter. Since IP networks are expected to grow as time progresses, additional jitter to that of the original jitter in the network can be expected, so that an IP reception device may not be capable of providing the necessary jitter buffer.

Jitter control is a mandatory requirement of media systems based on the MPEG transport specification. Failure to control jitter causes media to exhibit undesirable visual and audio artifacts to the end user. It is a task of the network infrastructure to remedy packet jitter by enhancing the quality of service in the network; but this is very difficult to achieve in a media delivery network.

Figure 1:
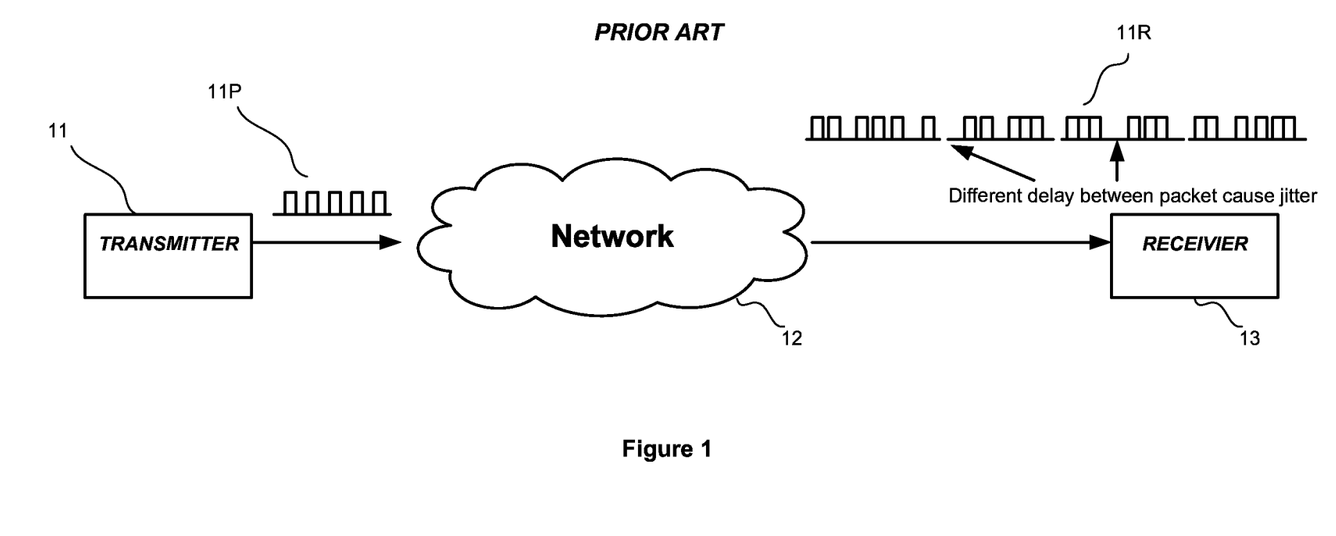
FIG. 1 illustrates a prior art system of streaming over a network with packet jitter artifacts.

FIG. 1 illustrates a Prior Art System for transmitting media packets. A transmitter 11 sends packets 11P at a fixed rate and with a minimal jitter through the network 12. The received packets 11R, after passage through the network 12, may have a different delay between packets, resulting in packet jitter, as well as a varying rate. These phenomena may detrimentally affect the performance of the receiver 13.

SUMMARY OF THE INVENTION

Embodiments of the present invention include one or more devices residing in a Video Delivery IP network. Preferably, each such device is physically located in the network so as to be close to an IP reception device or to a cluster of IP reception devices.

Each device provides a network jitter reduction and rate reconstruction using means for receiving streams with jitter, buffer the streams, and playing out/Streaming the stream at its original rate.

The new device buffers each stream, studies and calculates its original rate from the transport stream Program Clock Reference (PCR) and uses this rate to play-out the stream downstream and thus achieve a reduction in jitter.

The new resulting stream is unaffected by the new play-out, since no internal intervention has occurred. The buffer size and the delay can be either preprogrammed or calculated from the network jitter figure. Thus, for a larger jitter in the received packets, a commensurately larger buffer may be allocated, and/or at a larger delay.

The present patent application is the fourth of four applications being presently filed by the present applicant and inventor; embodiments of the inventions disclosed in these applications can be used together in various combinations:
 1. Adaptive FEC System and Method
 2. Packets Recovery System and Method
 3. Transport over UDP System and Method
 4. Media Stream Rate Reconstruction System and Method Further purposes and benefits of the current invention will become apparent upon reading the present disclosure and the related drawings.

DETAILED DESCRIPTION OF THE INVENTION

Glossary of Terms

Throughout the present disclosure, the following terms may be used:

Moving Picture Experts Group (MPEG) is a working group of experts that was formed by ISO and IEC to set standards for audio and video compression and transmission.

MPEG transport stream (TS) is a standard format for transmission and storage of audio, video, and Program and System Information Protocol (PSIP) data, and is used in broadcast systems such as DVB and ATSC. Transport Stream is specified in MPEG-2 Part 1, Systems (formally known as ISO/IEC standard 13818-1 or ITU-T Rec. H.222.0).

TS Packet is the basic unit of data in a transport stream. It consists of a sync byte, whose value is 0×47, followed by three one-bit flags and a 13-bit Packet Identifier (PID). This is followed by a 4-bit continuity counter. Additional optional transport fields, as signaled in the optional adaptation field, may follow. The rest of the packet consists of payload. Packets are 188 bytes in length.

Program Identifier (PID) Each table or elementary stream in a transport stream is identified by a 13-bit packet ID (PID). A demultiplexer extracts elementary streams from the transport stream in part by looking for packets identified by the same PID.

Program Clock Reference (PCR) is transmitted in the adaptation field of an MPEG-2 transport stream packet. The value of the PCR, when properly used, is employed to generate a system_timing_clock in the decoder. The PCR is used by the decoder to present synchronized content, such as audio tracks matching the associated video, at least once each 100 ms.

Real-time Transport Protocol (RTP) defines a standardized packet format for delivering audio and video over IP networks. RTP is used extensively in communication and entertainment systems that involve streaming media, such as telephony, video teleconference applications, television services and web-based push-to-talk features. RTP is used in conjunction with the RTP Control Protocol (RTCP). While RTP carries the media streams (e.g., audio and video), RTCP is used to monitor transmission statistics and quality of service (QoS) and aids synchronization of multiple streams. RTP is originated and received on even port numbers and the associated RTCP communication uses the next higher odd port number. RTP was developed by the Audio-Video Transport Working Group of the Internet Engineering Task Force (IETF) and first published in 1996 as RFC 1889, superseded by RFC 3550 in 2003.

User Datagram Protocol (UDP) is one of the core members of the Internet Protocol Suite, the set of network protocols used for the Internet. With UDP, computer applications can send messages, in this case referred to as datagrams, to other hosts on an Internet Protocol (IP) network without requiring prior communications to set up special transmission channels or data paths. UDP uses a simple transmission model without implicit handshaking dialogues for providing reliability, ordering, or data integrity. Thus, UDP provides an unreliable service and datagrams may arrive out of order, appear duplicated, or go missing without notice. UDP assumes that error checking and correction is either not necessary or performed in the application, avoiding the overhead of such processing at the network interface level.

Set-top box (STB) is an information appliance device that generally contains an interface to a network and connects to a television set and an external source of signal, turning the signal into content which is then displayed on the television screen or other display device. In IP networks, the set-top box is a small computer providing two-way communications on an IP network and decoding the video streaming media. IP set-top boxes have a built in home network interface which can be Ethernet or one of the existing wire home networking technologies.

Forward Error Correction (FEC)—Technique to recover packet information partial or full, based on calculation made on the information. Such techniques maybe by means of XOR between packets or any other mathematical computation.

Pro-MPEG—the Professional-MPEG Forum—is an association of broadcasters, program makers, equipment manufacturers, and component suppliers with interests in realizing the interoperability of professional television equipment, according to the implementation requirements of broadcasters and other end-users.

SMPTE 2022—The Pro-MPEG Forum began initial work on a FEC scheme for video transport. That work, added to by the Video Services Forum, was introduced to SMPTE. This proposed standard is known as SMPTE 2022, and it describes both a FEC scheme and a way to transport constant bit rate video over IP networks.

Embodiments of the current invention are described by way of example and with reference to the accompanying drawings.

Figure 2:
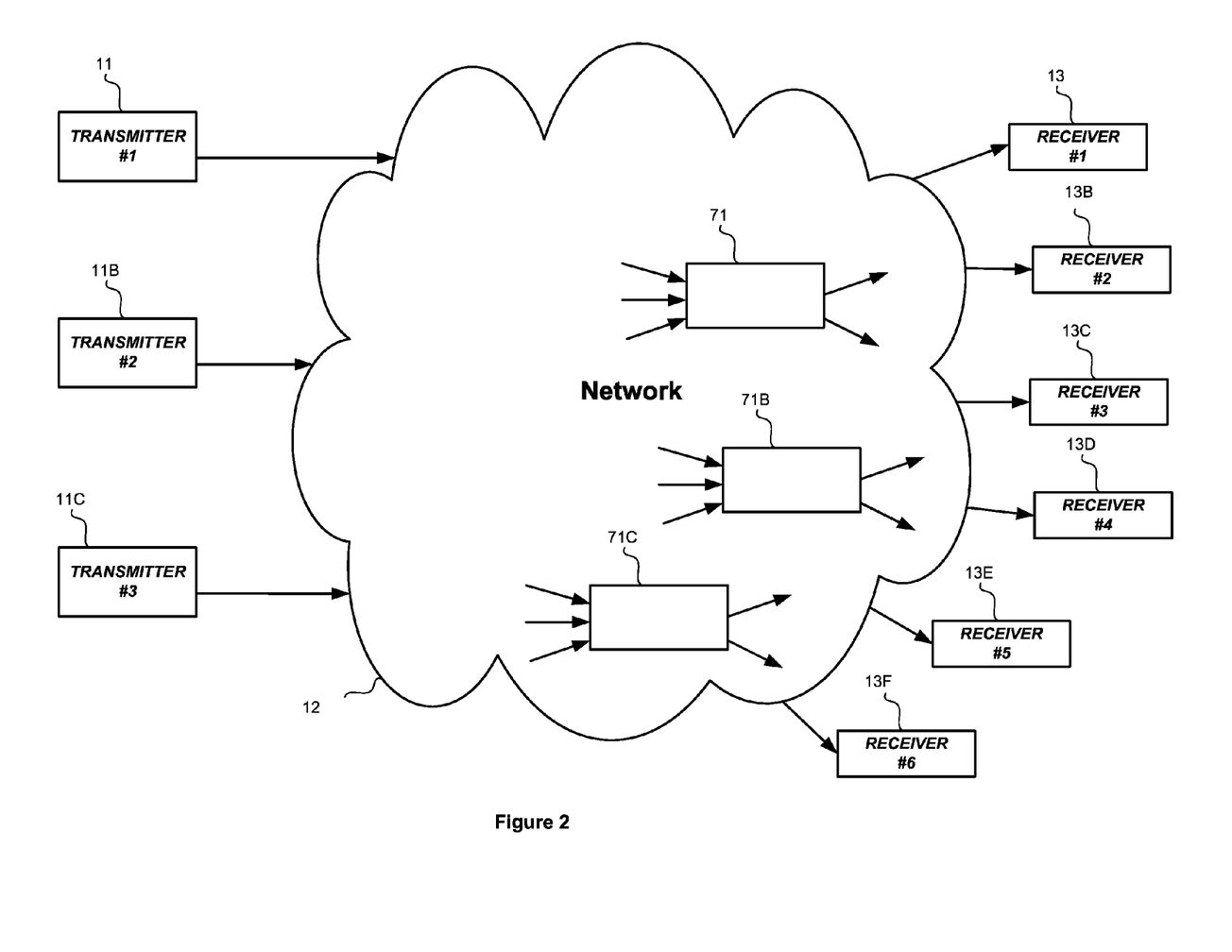
FIG. 2 illustrates an IP video delivery network with jitter and rate reconstruction devices.

FIG. 2 illustrates an IP video delivery network 12 with jitter and rate reconstruction devices 71, 71B, 71C. Transmitters 11, 11B, 11C respectively may send media streams over the network 12. Jitter and rate reconstruction devices 71, 71B, 71C, located in network 12 en route of the sent packets, act to improve performance of the network with respect to jitter.

In the example as illustrated, device 71 is located in proximity to receivers 13 and 13B; device 71B is located close to receivers 13C and 13D; and device 71C is located close to receivers 13E and 13F.

Figure 3:
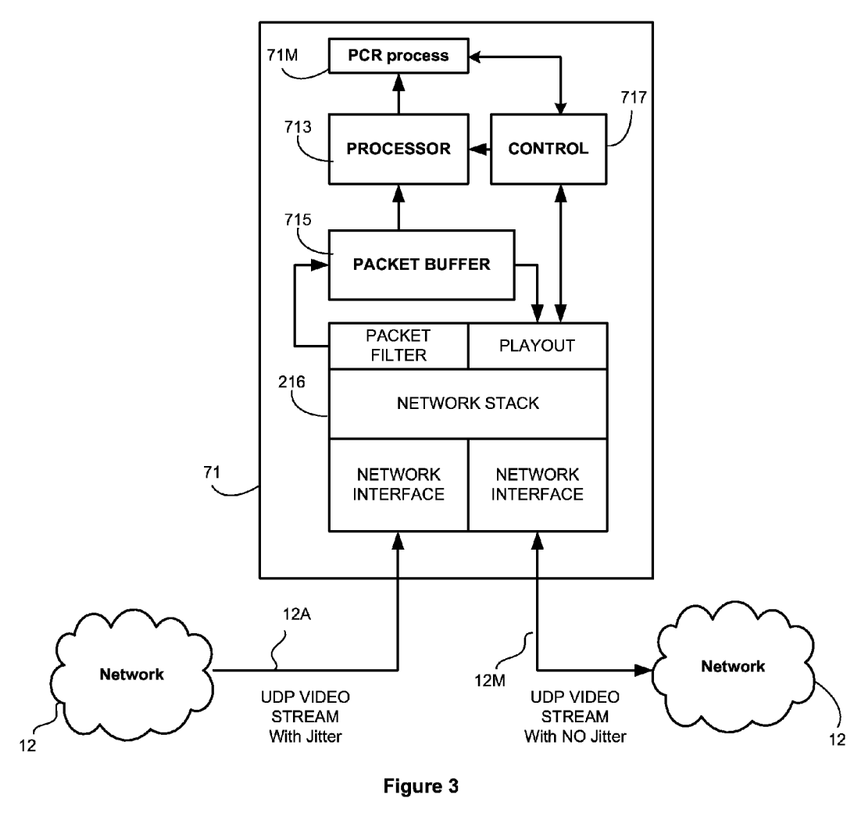
FIG. 3 illustrate a high level block diagram of a rate reconstruction device.

FIG. 3 illustrate a high level block diagram of a rate reconstruction device. A new device according to the present invention may include, for example, an IP interface (in unit 216), Buffer memory 715 to store the packets, Transport stream processing unit 713, Play out machine (in unit 216). The IP interface receives IP packets 12A and forwards them to the packets memory buffer 715. Each new packet is marked and stored for further processing in the Transport processing unit including for example a processor 713, PCR process 71M and control 717.

A UDP video stream having jitter 12A is received into the rate reconstruction device 71 from network 12. After processing in the device 71, an UDP video stream not having jitter 12M (or with significantly reduced jitter) is transmitted over the network 12.

Embodiments of the present invention provide a device that "cuts" the network and receives a jittered-network stream at its input, and issues/transmits a jitter-free output stream. The buffer memory stores each stream in a particular playout list for easy extraction and processing.

The transport stream processor accepts IP packets for processing. The processor searches for specific transport stream PCR information in one or more transport streams and then calculates the original bit rate by comparing the number of packets between two or more consecutive PCR values of the same PID (Packet Identifier). This process can run for one or more PIDs in the same transport stream to achieve better rate calculation. The calculated rate is then passed to the play out machine.

The play-out machine may include several counters, each associated with one stream in the memory buffer. The counters are updated by a value comprising a step to play the next packet. A step is calculated from the rate information in the Transport processor and the delay factor. The play-out machine scans the various counters and whenever a predefined count value is reached, the appropriate IP packet is read and played/streamed out.

Example of Use:

IP STB memory buffer is small due to the low cost nature of STB. If the STB jitter buffer is small, IP packets will be lost due to buffer overflow. Applying the device of an embodiment of the current invention reduces the jitter of the buffer to small jitter value—on the order of less than 1 millisecond—which helps the STB to reduce costs in memory buffer and to avoid packet loss.

An IP processor may be assigned the task of handling several streams simultaneously, and of maintaining a large memory buffer to handle large jitter values of each stream. Using the device of an embodiment of the current invention relaxes demands on the IP processor, which in turn enables it to handle more streams, due to the lower buffer requirement.

Figure 4:
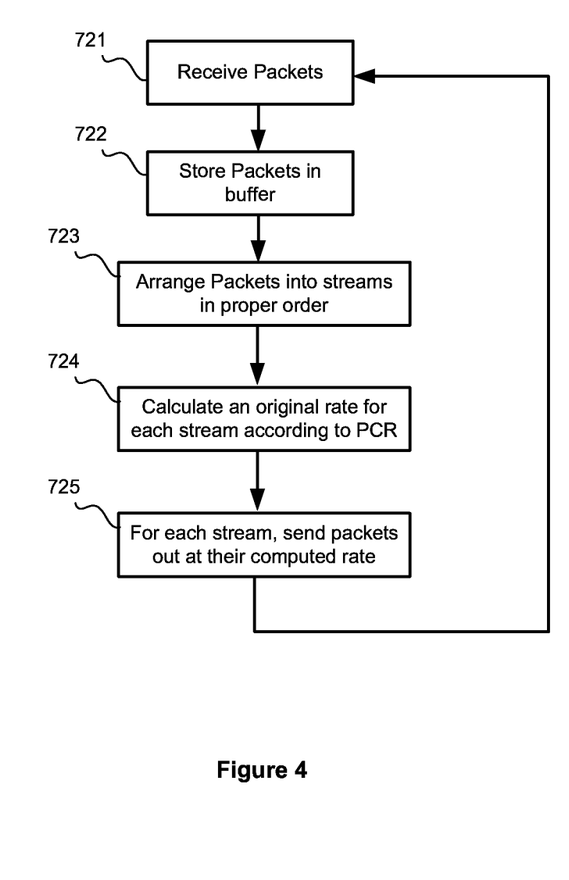
FIG. 4 illustrates a flow chart for a rate reconstruction method.

FIG. 4 illustrates in a flow chart form, a method for rate reconstruction. The method may include, for example, the following steps:

receive packets, step 721;
store packets in buffer, step 722;
arrange packets into streams in a proper order, step 723;
calculate an original rate for each stream 724; and
for each stream, send packets out at their computed rate 725.

Optionally or alternatively, embodiments of the present invention may be used with those of the invention disclosed by the present inventor, in a patent application entitled: "Adaptive FEC System and Method".

Optionally or alternatively, embodiments of the present invention may be used with those of the invention disclosed by the present inventor, in a patent application entitled: "Packets Recovery System and Method".

Figure 5:
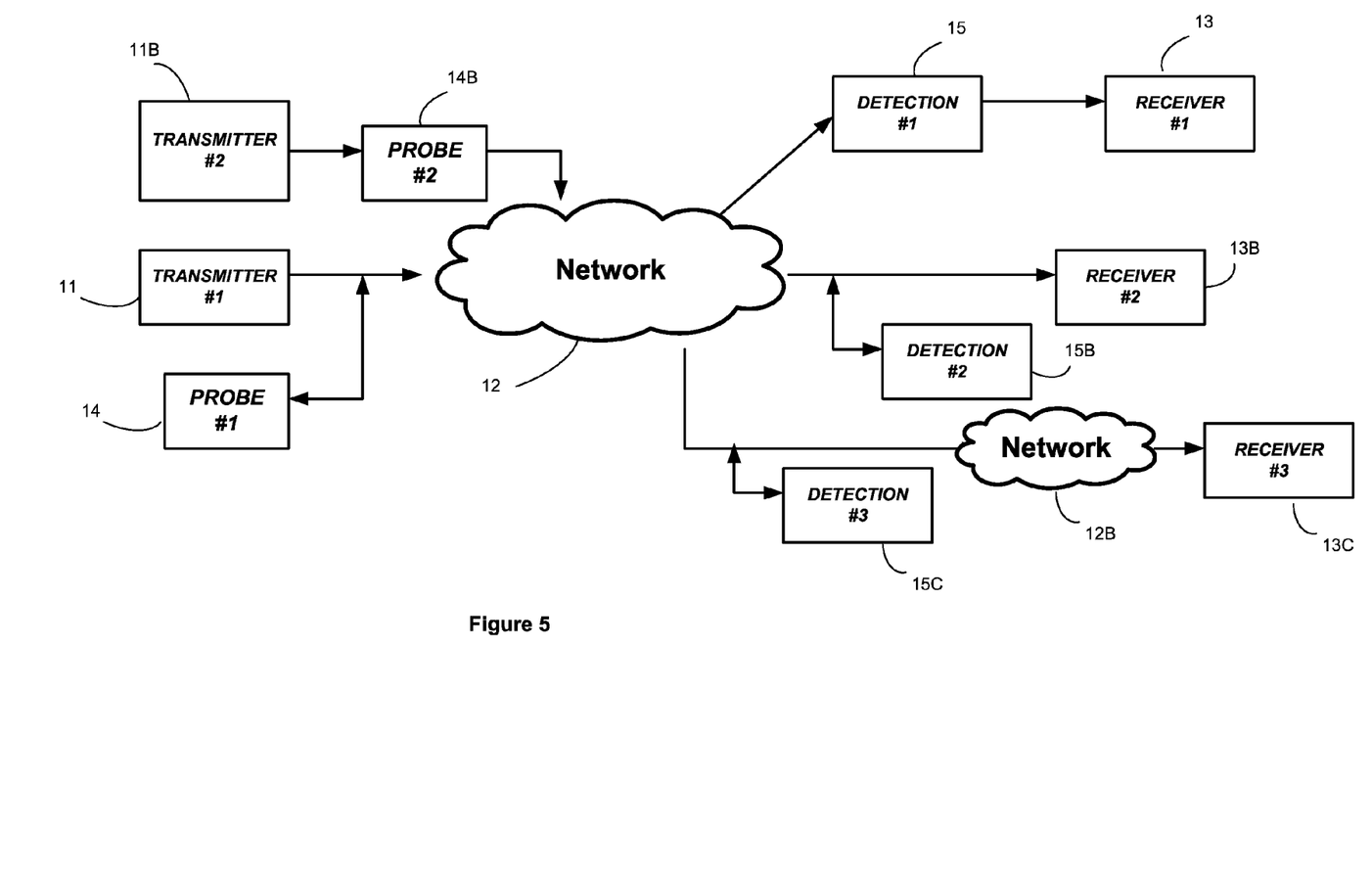
FIG. 5 illustrates a system architecture including both intrusive and non-intrusive deployment topology.

FIG. 5 illustrates a system architecture including both intrusive and non-intrusive deployment topology. The figure shows a system description and the various options for deploying Probe and Detection devices.

For example, Probe no 1 14 is connected in a non-intrusive mode (in parallel with transmitter no 1 11), whereas Probe no 2 14B is connected in an intrusive mode (in series with transmitter no 2 11B).

Detection device no 1 15 is connected in an intrusive mode (in series with receiver no 1 13), whereas the Detection devices no 2 15B and no 3 15C are connected in a non-intrusive mode (in parallel with receivers no 2 13B and no 3 13C, respectively).

The Intrusive devices (Probe no 2, Detection no 1) have at least one input and one output interface. Data flows from input to output with added processing in the device itself. A benefit of using an intrusive Probe device (Probe no 2) is a simpler data flow through each element; data flow from Transmitter no 2 through Probe no 2 allows for easy connection and a clear traffic flow, so that the Probe device will be assured to get ALL the packets from the transmitter into his packet buffer.

A benefit of using a detection device in an intrusive mode is a larger buffer, which can shield/buffer the receiver device from network artifacts such as jitter, packet reorder and packet loss. Another benefit of the intrusive mode is that it allows the detection device (refer to detection no 1 15) to recover packets without an interaction of the receiver (receiver no 1 13) and to perform a rate adjustment.

The non-intrusive device (probe no 1 14, detection no 2 15B and no 3 15C) are devices which have only a common input and output interface, Data flow in and out of the device with added processing in the device. A benefit of using a non intrusive device is an ability to put it anywhere in the network in a seamless fashion, so that it does not disturb the original network traffic. The devices can be simply added to the network and add their capabilities.

Probe no 1 14 is added in parallel to the Transmitter no 1 11. It is the network operator's responsibility to duplicate/direct the traffic from transmitter no 1 11 to allow probe no 1 14 to capture the packets in its memory buffer.

Detection no 2 15B and no 3 15C may be placed somewhere along the network 12 to allow detection no 2 and no 3 to detect packet loss events and alert the probe device 14 or 14B to take action. The system and method described hereinabove may be used in conjunction with:

a. A system which consists of adaptive FEC block+ network jitter reduction; for details, see the disclosure in another invention by the present inventor, which is concurrently being filed as a patent application by the present applicant, entitled: "Adaptive FEC System and Method".

b. A system which consist of retransmission block and network jitter reduction; for details, see the disclosure in another invention by the present inventor, which is concurrently filed as a patent application by the present applicant, entitled: "Packets Recovery System and Method".

Note: This is common to both retransmission and Network jitter reduction. The embodiment of the present invention is therefore a system solution to protect a media network from artifacts of network jitter. The system may include a probe device (probe no 1, no 2) connected in an intrusive or non-intrusive mode, and a detection device (detection no 1), connected in an intrusive mode.

Detection device 15 performs two major tasks: detection of missing packets; and reinsertion of retransmitted packets and Network jitter reduction. A unique feature of this solution is that the detection device shields the network artifices from the Receiver device (receiver no 1 13), to allow it to receive a media stream free of lost packets and with a minimal jitter—which are crucial to media reception solutions.

Figure 6:
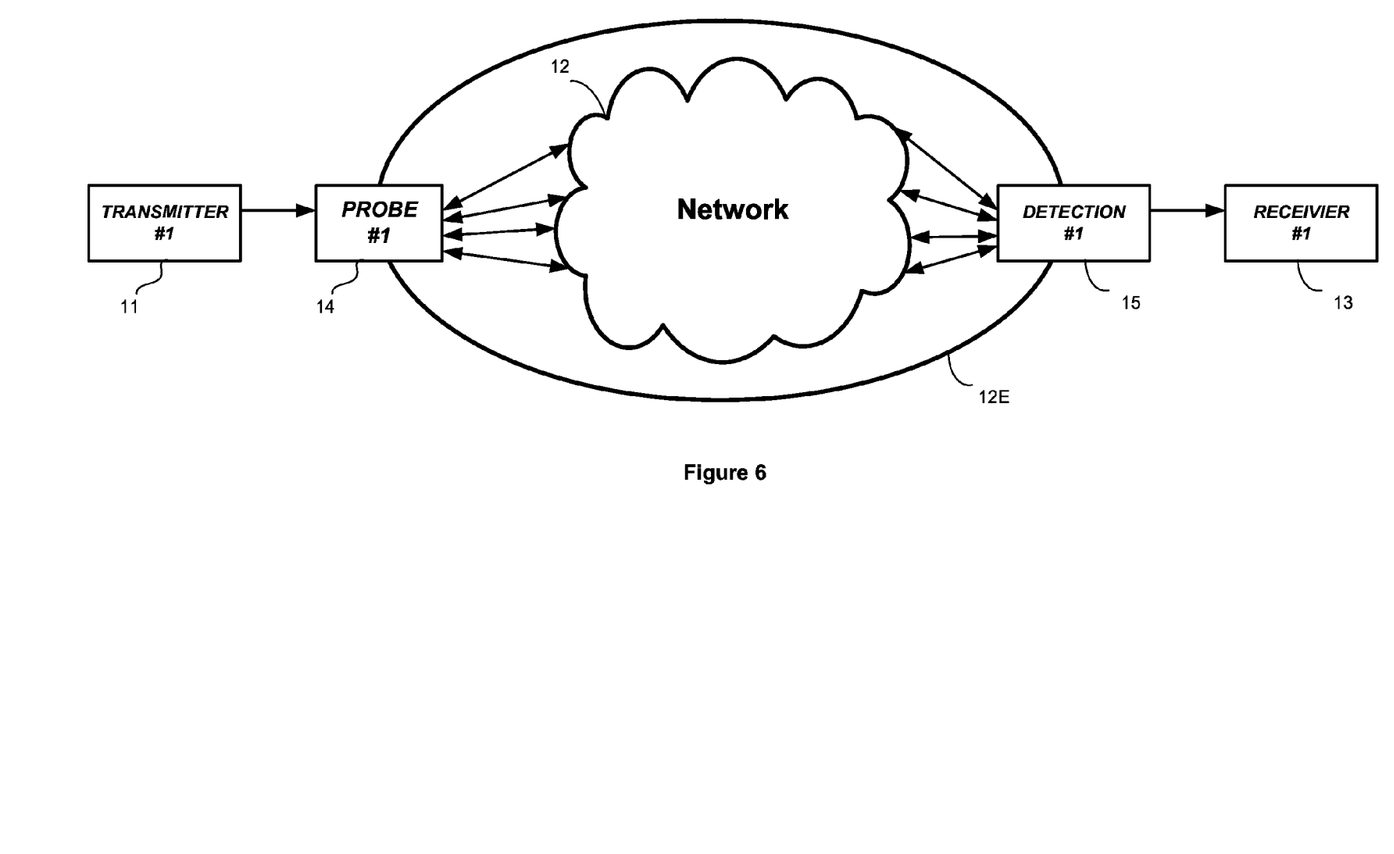
FIG. 6 illustrates an optional improvement of the IP video delivery network using a probe and a detection device.

FIG. 6 illustrates an optional improvement of the IP video delivery network, using a probe 14 and a detection device 15. In the figure, a transmitter 11 sends packets through a probe 14, a network 12 and a detection device 15, to a receiver 13. This optional improvement uses adaptive FEC packets/matrix for streaming over a public internet. The system uses re-multiplexing each stream into 1–N different UDP ports; each carrying a portion of the packets (e.g. 1/N, N number of selected paths). Each path will be protected by an adaptive FEC system and method, as disclosed in the present applicant's co-pending Israeli patent application No. 217307, entitled: 'Adaptive FEC System and Method' to protect against packet loss in that specific path.

As shown in FIG. 6, probe 14 splits the original stream into multiple smaller streams (up to N) while detection device 15 receives the stream and applies an adaptive FEC/Matrix to each smaller stream. Detection device 15 then re-multiplexes these streams into a single stream which is sent to receiver no 1 13.

Probe device 14 may include an additional block module to re-multiplex the stream into partial streams send on different ports. The multiplexing may be according to a modulo N basis (e.g. each packet will be assigned to a port according to its Sequence number) or any other priority scheme. In an embodiment of the present invention, each 'new' stream should be assigned with at least 5 UDP ports (1 data, +1 RTCP, +2 Column FEC, +4 Row FEC) probe other modules are left unchanged (e.g. packet buffer, processor) and the only addition is a block to re-multiplex the stream; any RTCP message is considered as a request from a detection device and will be handled with no change.

The Probe device should preferably be connected in an intrusive fashion (in series with the transmit path, see FIG. 6) so that the transmitting device need not be aware of the re-multiplexing of the original stream.

Detection device 15 may have an additional module for multiplexing back the partial streams before being stored in the packet memory buffer. The detection device 15 may have to maintain N clients for each partial stream. Each client passes the received packet to the packet buffer memory.

Each client maintains a missing packet detection process for each partial stream. In the event of missing packet detection, the client issues an RTCP message associated with that stream UDP port number. Each client will pass the FEC packet to the processor to recover the lost packet.

Detection device 15 performs rate reconstruction according to the description in this invention, based on PCR information provided in the media stream. The detection device inspects the stream located in the packet buffer to detect packets carrying PCR information. The PCR information is then used to calculate the original stream rate and play out the stream according to this calculated rate. The rate reconstruction reduces the network jitter as is observed by the receiving (receiver no 1 13).

It will be recognized that the foregoing is but one example of an apparatus and method within the scope of the present invention and that various modifications will occur to those skilled in the art upon reading the disclosure set forth hereinabove.

What is claimed is:

1. In a media delivery system for transmitting IP packets using RTP over an asynchronous IP network,
   a device configured to: receive a UDP video stream having packet jitter from the IP network; to decouple the network stream; and to reconstruct and send a UDP video stream downstream having no jitter or with significantly reduced packet jitter to the network, the device comprising means for:
   receiving streams originating from a transmitter, the streams having packet jitter and arriving through different paths in the network;
   buffering according to RTP sequence number of the streams;
   reordering the streams;
   calculating an original transmission rate from packet Program Clock Reference (PCR); and
   playing out/streaming each RTP packet of the streams to the IP network at the original transmission rate;
     wherein the device further includes a transport stream processing unit and a play out machine;
     wherein the transport stream processing unit includes means for accepting IP packets, means for looking for specific transport stream PCR information in one or more transport streams, and for calculating an original bit rate by comparing the number of packets between two or more consecutive PCR values of the same Packet Identifier (PID).

2. The device according to claim 1, further including means for adjusting a buffer size and delay responsive to the actual jitter figure.

3. The device according to claim 1, wherein the device is located on the network in proximity to a receiver or a cluster of receivers.

4. The device according to claim 1, wherein the device further includes an IP interface and a buffer memory to store the packets.

5. The device according to claim 1, wherein the transport stream processing unit further includes means performing the process simultaneously for one or more PIDs in the same transport stream to achieve better a rate calculation.

6. The device according to claim 5, wherein the calculated rate is passed to the play out machine for controlling the rate of transmitting packets out of the device.

7. A method for jitter reduction, rate reconstruction and transmitting IP packets using RTP over an asynchronous IP network comprising the steps of:
   a. receiving UDP video streams originating from a transmitter, the streams having packet jitter and arriving through different paths in the network;
   b. buffering according to RTP sequence number of the streams;
   c. reordering the streams;
   d. calculating an original transmission rate from packet Program Clock Reference (PCR); and
   e. playing out/streaming each RTP packet of the streams to the IP network at the original transmission rate;
   wherein the method further includes a transport stream processing unit and a play out machine;
   wherein the transport stream processing unit includes means for accepting IP packets, means for looking for specific transport stream PCR information in one or more transport streams, and for calculating an original bit rate by comparing the number of packets between two or more consecutive PCR values of the same Packet Identifier (PID).

8. The method according to claim 7, wherein the method further includes an IP interface and a buffer memory to store the packets.

9. The method according to claim 7, wherein the transport stream processing unit further includes means for performing the process simultaneously for one or more PIDs in the same transport stream to achieve better a rate calculation.

10. The method according to claim 7, wherein the transport stream processing unit further includes means for performing the process simultaneously for one or more PIDs in the same transport stream to achieve better a rate calculation.

11. The method according to claim 10, the calculated rate is passed to the play out machine for controlling the rate of transmitting packets out of the device.

* * * * *